United States Patent
He et al.

(10) Patent No.: US 10,767,941 B2
(45) Date of Patent: Sep. 8, 2020

(54) METHOD OF FORMING A SUPERHYDROPHOBIC LAYER ON A MOTOR VEHICLE HEAT EXCHANGER HOUSING AND A HEAT EXCHANGER INCORPORATING SUCH A HOUSING

(71) Applicant: FORD GLOBAL TECHNOLOGIES, LLC, Dearborn, MI (US)

(72) Inventors: Jing He, Novi, MI (US); Manfred Koberstein, Troy, MI (US); Loren John Lohmeyer, III, Monroe, MI (US); Tim Van Evans, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 16/132,052

(22) Filed: Sep. 14, 2018

(65) Prior Publication Data
US 2020/0088481 A1   Mar. 19, 2020

(51) Int. Cl.
F28D 19/02   (2006.01)
F28F 13/18   (2006.01)

(52) U.S. Cl.
CPC .......... *F28F 13/18* (2013.01); *F28F 2245/04* (2013.01)

(58) Field of Classification Search
CPC ............................... F28F 13/18; F28F 2045/04
USPC ........................................................ 165/133
See application file for complete search history.

(56) References Cited

U.S. PATENT DOCUMENTS

| 6,103,373 | A | * | 8/2000 | Nishimura | D01F 9/127 423/445 R |
|---|---|---|---|---|---|
| 6,451,382 | B2 | | 9/2002 | Schutt et al. | |
| 9,121,306 | B2 | | 9/2015 | Aizenberg et al. | |
| 9,388,325 | B2 | | 7/2016 | Jones et al. | |
| 2006/0099784 | A1 | * | 5/2006 | Suzuki | H01L 29/66583 438/585 |
| 2006/0288716 | A1 | | 12/2006 | Knight et al. | |
| 2008/0163893 | A1 | * | 7/2008 | Quillen | C11D 3/2017 134/2 |

(Continued)

FOREIGN PATENT DOCUMENTS

| CA | 2739903 C | 12/2016 |
|---|---|---|
| CN | 101307208 B | 5/2010 |

(Continued)

OTHER PUBLICATIONS

English Machine Translation of CN101307208B dated Nov. 19, 2008.

(Continued)

*Primary Examiner* — Davis D Hwu
(74) *Attorney, Agent, or Firm* — David Coppiellie; King & Schickli, PLLC

(57) ABSTRACT

A method of forming a superhydrophobic layer on a motor vehicle heat exchanger housing includes the steps of flowing a precursor gas of a mixture of heptadecafluoro-1,1,2,2-tetrahydrodecyl, trimethoxysilane (HTMS) and a carrier gas into a reaction chamber and depositing the superhydrophobic layer on the motor vehicle heat exchanger housing by chemical vapor deposition. A heat exchanger having a heat exchanger housing with a superhydrophobic layer made by the chemical vapor deposition method is also disclosed.

9 Claims, 3 Drawing Sheets

(56) References Cited

U.S. PATENT DOCUMENTS

| | | | |
|---|---|---|---|
| 2008/0213853 A1* | 9/2008 | Garcia | B01L 3/0268 435/173.1 |
| 2011/0240595 A1 | 10/2011 | Dubrow | |
| 2014/0231052 A1 | 8/2014 | Takasawa et al. | |
| 2015/0107278 A1 | 4/2015 | Schmitz et al. | |

FOREIGN PATENT DOCUMENTS

| | | |
|---|---|---|
| CN | 103702928 A | 4/2014 |
| CN | 107057568 A | 8/2017 |
| KR | 20110118475 A | 10/2011 |
| WO | 2013184559 A1 | 12/2013 |
| WO | 2017031391 A1 | 2/2017 |

OTHER PUBLICATIONS

English Machine Translation of CN103702928 dated Apr. 2, 2014.
English Machine Translation of CN107057568 dated Aug. 18, 2017.
English Machine Translation of KR20110118475 dated Oct. 31, 2011.
Golovin et al; "Designing Self-Healing Superhydrophobic Surfaces with Exceotinal Mechanical Durability"; ACS Applied Materials & Interfaces; 2017, 9, pp. 11212-11223; DOI: 10.1021/acsami. 6b15491; www.acsami.org; published Mar. 7, 2017.

\* cited by examiner

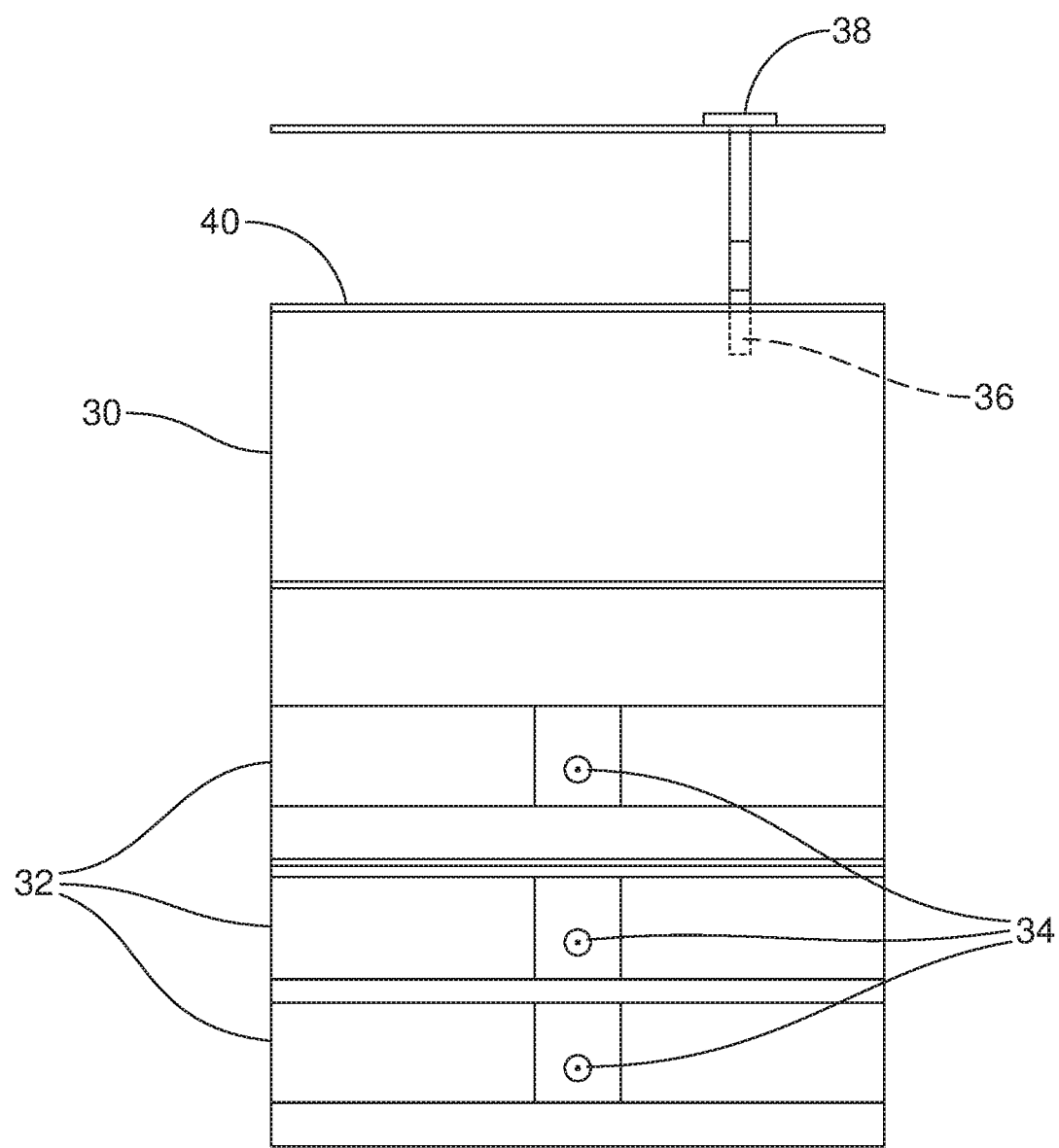

METHOD OF FORMING A SUPERHYDROPHOBIC LAYER ON A MOTOR VEHICLE HEAT EXCHANGER HOUSING AND A HEAT EXCHANGER INCORPORATING SUCH A HOUSING

TECHNICAL FIELD

This document relates generally to methods for preventing or delaying icing on a motor vehicle heat exchanger housing, as well as to a motor vehicle heat exchanger including a heat exchanger housing with a superhydrophobic layer.

BACKGROUND

Frost growth or icing on heat exchangers adversely affects performance of refrigeration systems by blocking the air flow path and increasing thermal resistance. In a mobile air conditioning system such as found on a motor vehicle, an inappropriate (a) placement of a thermistor or (b) compressor cycling strategy could cause the evaporator temperature to drop below freezing point which leads to icing on evaporator surfaces. Icing on the outside heat exchanger of a heat pump system, where the inner fluid temperature could operate well below 0 degrees C. during the heating mode, is particularly concerning. As the ice builds up, the heat pump has to cease heating operation and switch to de-icing/defrosting mode, during which a separate source is required to continue supplying heat. In severe scenarios, a de-icing cycle could consume over 20% of the time in the heating mode.

Control strategies are a common approach to mitigate or suppress icing. Prior control strategies include minimizing the potential between evaporating temperature and air inlet temperature (see, for example, U.S. Published Patent Application 2015/0107278) or elevating heat pressure to allow operation at lower ambient temperature (see, for example, U.S. Published Patent Application 2006/0288716). The effectiveness of such control strategies and the impact on system performance remain unclear due to lack of testing data. In addition, extra temperature and pressure sensors are generally required in order to implement the strategies.

Additive coating is another popular approach to avoid or delay icing and reduce the icing cycle/energy. Additive coating aims to create a hydrophobic (or hydrophilic in a less popular fashion) structure on the fin surface of the heat exchanger that facilitates condensate shedding and eventually delays icing. For example, Takasawa et al. (U.S. Published Patent Application 2014/0231052) proposed a pretreated fin material with a hydrophobic film on one surface and a hydrophilic film on the other. During condensation, a water droplet can be quickly removed by bringing it into contact with the hydrophilic film. Consequently, a favorable heat exchanger function can be maintained without any increase in ventilation resistance. In this approach, the cross linked hydrophobic film is resin based and formed by baking the fins after the application of hydrophobic coating.

Oligometic silane compositions containing, for example, methyltrimethoxysilane, are disclosed in the U.S. Pat. No. 6,451,382 B2 to coat new or used heat exchange apparatus via dipping or spraying for heat transfer improvement and corrosion prevention. The chemical formula of the silane is $R_n^1Si(OR^2)_{4-n}$, where $R^1$ presents a $C_1$-$C_6$ alkyl group, a $C_6$-$C_8$ aryly group or a functional group including at least one of vinyl, acrylic, amino, mercapto, or vinyl chloride functional groups, $R^2$ represents a $C_1$-$C_6$ alkyl or acetyl group and n is a number of 1 or 2.

A self-healing, slippery liquid-infused porous surface (SLIPS) is described in the U.S. Pat. No. 9,121,306 B2, where a lubricant fluid that has a chemical affinity to the substrate is used to wet the substrate. The lubricant on the SLIPS sticks to the surface. The adhesion of the lubricant to the surface is greater than the adhesion of water to the surface. With time, the lubricant can be drained away from the surface. Based on the inventors' search, among the existing coating methods, (a) lithography is not easy to scale, (b) dip coating or spray coating results in a thick layer and tends to decrease heat transfer and (c) liquid infusion is not durable due to lubricant loss. This document relates to a new and improved method of forming a superhydrophobic layer on a heat exchanger housing. That method is relatively simple, economical, reliable, durable and scalable.

SUMMARY

In accordance with the purposes and benefits described herein, a new and improved method is provided of forming a hydrophobic layer on a motor vehicle heat exchanger housing. That method comprises the steps of preparing the motor vehicle heat exchanger housing for chemical vapor deposition, placing the motor vehicle heat exchanger housing in the reaction chamber, flowing a precursor gas of a mixture of heptadecafluoro-1,1,2,2-tetrahydrodecyl, trimethoxysilane (HTMS) and a carrier gas into the reaction chamber and depositing the superhydrophobic layer onto the heat exchanger housing by chemical vapor deposition. HTMS has the chemical formula:

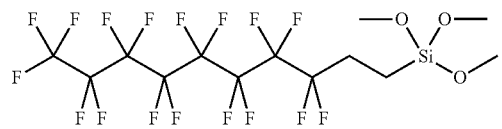 [SMILES: CO[Si](CCC(F)(F)C(F)(F)C(F)(F)C(F)(F)C(F)(F)C(F)(F)C(F)(F)C(F)(F)F)(OC)OC]

More specifically, the method may include the steps of cleaning the motor vehicle heat exchanger housing with acetone and then cleaning the motor vehicle heat exchanger housing with ethanol. Further, the method may include the step of rinsing the motor vehicle heat exchanger housing with deionized water followed by the step of drying the motor vehicle heat exchanger housing.

Still further, the method may include the step of soaking the motor vehicle heat exchanger housing in a hot water bath following drying. Still further, the method may include the step of using toluene as the carrier gas. Still further, the method may include the step of maintaining an environment within the reaction vessel at about 90 degrees C. in temperature and about 101,325 newtons/meter² in pressure during the depositing.

In accordance with yet another aspect, a motor vehicle heat exchanger is provided. That motor vehicle heat exchanger comprises a motor vehicle heat exchanger housing and a superhydrophobic layer on the motor vehicle heat exchanger housing. That superhydrophobic layer is made by chemical vapor deposition of a precursor gas of a mixture of HTMS and a carrier gas such as toluene.

In the following description, there are shown and described several preferred embodiments of the method and the motor vehicle heat exchanger produced by the method. As it should be realized, the method and the motor vehicle heat exchanger are capable of other, different embodiments and their several details are capable of modification in various, obvious aspects all without departing from the method and motor vehicle heat exchanger as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and a heat exchanger produced by the method and together with the description serve to explain certain principles thereof.

FIG. 3 is a schematic illustration of the boiler furnace or reaction vessel utilized in the experimental example performing the method and forming a superhydrophobic layer on a heat exchanger housing.

Reference will now be made in detail to the present preferred embodiments of the method, examples of which are illustrated in the accompanying drawing figures.

DETAILED DESCRIPTION

Figure 1:
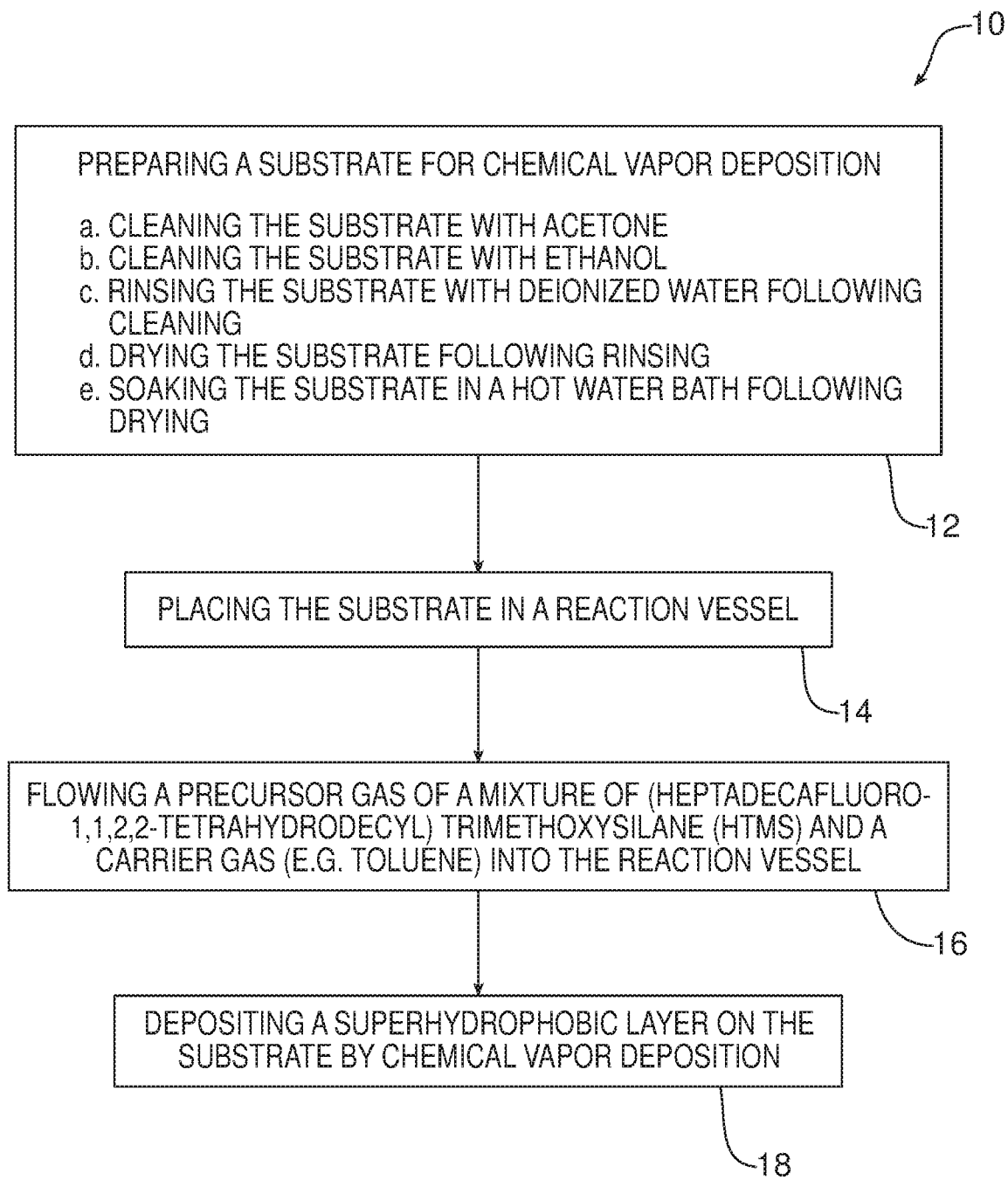
FIG. 1 is a schematic block diagram of the method of forming a superhydrophobic layer on a motor vehicle heat exchanger housing.

Reference is now made to FIG. 1 which is a schematic block diagram of the method 10 of forming a superhydrophobic layer on a motor vehicle heat exchanger housing. Such a housing may include a plurality of fins or vanes to maximize surface area and provide enhanced heat exchange performance. That method broadly includes the steps of preparing a motor vehicle heat exchanger housing for chemical vapor deposition 12, placing the motor vehicle heat exchanger housing in a reaction vessel 14, flowing a precursor gas of a mixture of heptadecafluoro-1,1,2,2-tetrahydrodecyl, trimethoxysilane (HTMS) and a carrier gas into a reaction chamber and depositing the superhydrophobic layer on the motor vehicle heat exchanger housing by chemical vapor deposition 18. Toluene is a particularly useful carrier gas for the method since HTMS is highly soluble than toluene, toluene may be made anhydrous in a relatively easy manner and toluene is not reactive with aluminum thereby allowing the treated substrate to be made from aluminum.

More particularly, the step of preparing the motor vehicle heat exchanger housing for chemical vapor deposition 12 may include a number of sub steps. As illustrated in FIG. 1, hose sub steps include cleaning the motor vehicle heat exchanger housing with acetone, cleaning the motor vehicle heat exchanger housing with ethanol, rinsing the motor vehicle heat exchanger housing with deionized water following cleaning with acetone and/or ethanol, drying the substrate following rinsing and soaking the substrate in a hot water bath following drying. In one particularly useful embodiment, the substrate may be soaked in a hot water bath at about 90 degrees C. for about one hour following the drying step. Where the substrate is made from aluminum, this soaking step develops a rough nanoscale structure having a height of approximately 50 nm all over the surface of the aluminum substrate. The rough structures are made of AlO(OH) or boehmite which additionally passivates the surface from corrosion.

The precursor gas for the chemical vapor deposition may be prepared by mixing the HTMS and carrier gas, such as toluene, together at a volume-to-volume ratio of between 1-15 and 1-23. In one particularly useful embodiment the HTMS and toluene are mixed together at a volume-to-volume ratio of 1 to 19 to form a precursor gas that is 5% HTMS.

The environment within the reaction vessel should be maintained at a desired temperature and pressure during the step of depositing the superhydrophobic layer on the surface of the substrate by chemical vapor deposition. In one particularly useful embodiment, the environment within the reaction vessel is maintained at a temperature of about 90 degrees C. and a pressure of about 101,325 newtons/meter$^2$ squared during the depositing step.

Figure 2:
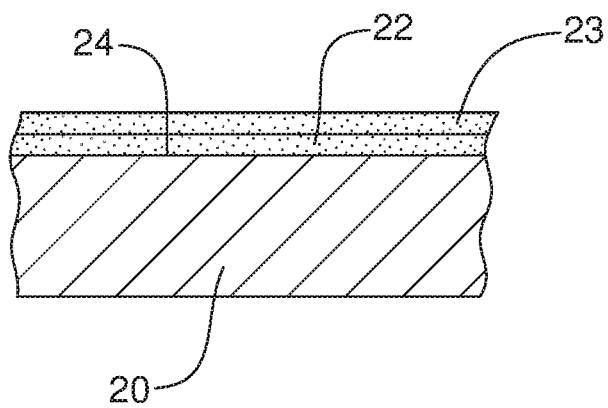
FIG. 2 is a cross sectional view of a motor vehicle heat exchanger and, more particularly, a motor vehicle heat exchanger housing incorporating a superhydrophobic layer made by chemical vapor deposition.

FIG. 2 illustrates the rough structure 22 ('oxidized layer') developed on the surface 24 of the aluminum substrate 20. The superhydrophobic layer 23 is deposited on the rough structure 22. More particularly, the deposited superhydrophobic layer 23 on the rough structure 22 may have a thickness of between, for example, 2 nm and 3 nm. In one particularly useful embodiment, the superhydrophobic layer has a thickness of approximately 2.5 nm.

Significantly, the chemical vapor deposition process allows the polar end of the silane moiety of the HTMS to chemically bond with the surface 24 of the heat exchanger housing 20. This leaves the non-polar end of the silane moiety to repel any water. Significantly, the combination of the roughened features on the surface 24 are created by the hot water treatment process and the superhydrophobic coating 22 creates the high degree of superhydrophobicity observed for the heat exchanger housing 20. Here it should also be mentioned that the chemical bond is a strong covalent bond and this means that the coating 22 is very durable, especially so when it is subject to a high amount of thermal stress.

The following experimental example is provided to further illustrate the method.

EXPERIMENTAL EXAMPLE

The coating process below will often refer to a boiler or a furnace. As shown in FIG. 3, a stainless steel drum 30 was used as both the boiler (for the hot water treatment process) and the furnace (the reaction vessel for the chemical vapor deposition process). Stainless steel drums are easy to procure and have high temperature and chemical tolerance. The volume of the drum was designed to be around 55 gallons and could accommodate a variety of heat exchangers. The decision was made easier by the fact that heating elements for the drum are commercially available. Three 1440 Watt Briskheat heating tapes 32 were wrapped around the drum 30. Each of the heating tapes 32 has a temperature controller 34 with a maximum temperature setting of about 205° C. (400° F.). The three heating tapes 32 cover the lower third volume of the drum 30. The temperature controllers 34 are always in contact with the drum 30. The drum 30 and the heating tape assembly is covered with a high temperature fiberglass insulation jacket (not shown) that prevents unnecessary heat loss from the drum during the heating process and makes it easier for the operators to handle the drum during the coating process as well. The drum 30 is also placed on a high capacity circular dolly, commercially available and specifically designed for handling 55 gallon drums. Insulation is placed between the drum and the dolly as well.

A thermowell 36 was welded to a hole that was drilled into the lid. An industrial grade thermometer 38 is screwed into the thermowell 36 to allow accurate temperature measurements of the atmosphere or environment inside the drum. The lid's original EPDM gasket was replaced with a high temperature fiberglass gasket. The lid clamp was also replaced with a quick release clamp. The top of the lid 40 is also covered with a removable fiberglass insulation panel (not shown).

The heat exchangers need to be cleaned prior to the coating process in order to remove organic contaminants from their surface. Acetone and ethanol are used during this process. Cleaning of the heat exchangers can be done manually in small-scale processing, or other means suitable for batch processing. For example, a spray bottle can be used to spray acetone and ethanol on the heat exchanger. To ensure thorough cleaning of the heat exchanger, a preset pattern is detailed below (this procedure applies to heat exchangers that are 0.5 to 1 inch in thickness):

a. Place the heat exchanger in an appropriately sized tray. The tray will be useful for collecting the cleaning agents for safe disposal.
  b. Fill two separate 300 ml spray bottles with acetone and ethanol.
  c. Side 1 of the heat exchanger—Hold the spray bottle containing acetone 10-20 cm from the face of the heat exchanger and spray thoroughly so that all the fins are covered with the cleaning agent. Hold it at an angle so that the spray hits the fin surfaces directly. Spray from top to bottom and left to right.
  d. Side 2 of the heat exchanger—Flip the heat exchanger and perform step 2 but from the opposite direction.
  e. Repeat step 2 in the opposite direction.
  f. Repeat step 3 in opposite direction.
  g. Rinse the heat exchanger thoroughly with deionized water.
  h. Repeat above process with ethanol.
  i. Safely dispose of the chemicals.

Hot Water Treatment
  a. The boiler is filled with enough deionized water such that the heat exchangers can be completely submerged and that we account for losses through evaporation.
  b. The temperature of the three heating tapes is initially set to about 205° C. (400° F.). This setting is maintained until the temperature of the water reaches 90° C. or until boiling is observed. 3 to 6 hours depending on the volume of the water in the boiler.
  c. The clean heat exchangers are then placed into the hot/boiling water. The water can be allowed to flow into the heat exchangers. In case the internal components need to be protected from water, the best option would be to fill the heat exchanger with an inert liquid and seal it.
  d. The temperature of the controllers is then set to about 121° C. (250° F.), this ensure that the water in the drum remains at 90° C. The boiler is covered by a lid which decreases the rate of heat loss.
  e. The heat exchangers are removed after an hour of treatment. They are dried in air and drained thoroughly, wrapped carefully in a clean plastic cover, and stored till they can be coated.
  f. This process develops a rough nanoscale (feature height ~50 nm) structure all over the aluminum surface. The rough structures are made of AlO(OH) or bohemite which additionally passivates the surface from corrosion.
  g. The water cannot be reused, it is allowed to cool and drained using a pump.
  h. The boiler is then cleaned using a soap solution. It is then ready for use as a furnace.

Silane Coating—Chemical Vapor Deposition (CVD)
  a. The heaters are set to about 205° C. (400° F.) and the drum is allowed to reach a temperature of 80° C. The heat exchangers can be kept in the drum during this heating process to evaporate any remaining water from the previous step.
  b. A 19:1 solution of toluene and Heptadecaflouro-(Tertrahydrodecyl)-Trimethoxy Silane (HTMS) by volume is measured out in a small beaker and placed in the drum with the heat exchangers once the internal temperature reaches 80° C. The amount of carrier gas (Toluene) and the superhydrophobic silane used for a particular number of heat exchangers is calculated by taking the monolayer coating thickness (~2.5 nm, measured using spatially resolved ellipsometry) as well as the leakage rate from the furnace into account.
  c. The lid is replaced and the sealed carefully using the quick release clamp. The heating tapes are set to about 88° C. (190° F.).
  d. The heating tapes are turned off after 3 hours. The drum is allowed to cool overnight while it is sealed. This allows any remaining toluene and HTMS solution to condense.
  e. This chemical vapor deposition process allows the polar end of the silane to chemically bond with the surface of the heat exchanger. This leaves the non-polar end of the silane to repel any water. The combination of the rough features created by the hot water treatment process and the super hydrophobic coating creates the high degree of superhydrophobicity observed in our heat exchangers. It is also prudent to mention that this chemical bond is a strong covalent bond and this means that the coating is very durable, especially so when it is subject to a high amount of thermal stress.
  f. The heat exchangers are removed. At this point they should be superhydrophobic and ready to use. The drum is cleaned using Toluene, Acetone, and deionized water in that order.

The heat exchangers coated with the above procedure have conformal, durable, and effective superhydrophobic fins. The procedure is simple and easily scalable. During condensation, coalescence induced jumping droplets carry condensate away from the surface of the heat exchanger and delay the frost growth while decreasing the thermal resistance posed by non-condensable gases. The presence of airflow increases the mobility of the droplets and causes them to coalesce at a higher frequency. This results in a cleaner surface and longer delay in the growth of frost.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:
1. A method of forming a superhydrophobic layer on an aluminum heat exchanger housing, comprising:
  preparing said aluminum heat exchanger housing for chemical vapor deposition;
  placing said aluminum heat exchanger housing in a reaction chamber;

flowing a precursor gas of a mixture of (heptadecafluoro-1,1,2,2-tetrahydrodecyl) trimethoxysilane and a carrier gas into said reaction chamber; and depositing and maintaining said superhydrophobic layer on an outer oxidized layer of said aluminum heat exchanger housing by chemical vapor deposition.

2. The method of claim 1, wherein said preparing includes cleaning said aluminum heat exchanger housing with acetone.

3. The method of claim 2, wherein said preparing further includes cleaning said heat exchanger housing with ethanol after said cleaning of said aluminum heat exchanger with acetone.

4. The method of claim 3, wherein said preparing includes rinsing said aluminum heat exchanger housing with deionized water and then drying said aluminum heat exchanger housing.

5. The method of claim 4, wherein said preparing includes soaking said aluminum heat exchanger housing in a water bath following cleaning and rinsing in order to develop the outer oxidized layer on the aluminum heat exchanger housing.

6. The method of claim 5, including using toluene as said carrier gas.

7. The method of claim 6, including maintaining an environment within said reaction chamber at about 90° C. in temperature and about 101,325 Newtons/meter$^2$ in pressure during said depositing.

8. A motor vehicle heat exchanger, comprising:
an aluminum heat exchanger housing including an outer oxidized layer; and
a superhydrophobic layer on said outer oxidized layer of said aluminum heat exchanger housing made by chemical vapor deposition of a precursor gas of a mixture of (heptadecafluoro-1,1,2,2-tetrahydrodecyl) trimethoxysilane and a carrier gas.

9. A method of forming a superhydrophobic layer on a motor vehicle heat exchanger housing, comprising:
preparing said heat exchanger housing for chemical vapor deposition;
placing said heat exchanger housing in a reaction chamber;
flowing a precursor gas of a mixture of (heptadecafluoro-1,1,2,2-tetrahydrodecyl) trimethoxysilane and a carrier gas into said reaction chamber; and
depositing said superhydrophobic layer on said heat exchanger housing by chemical vapor deposition by maintaining an environment within said reaction chamber at about 90° C. in temperature and about 101,325 Newtons/meter$^2$ in pressure during said depositing.

* * * * *